(12) United States Patent
Kusumi

(10) Patent No.: US 9,233,613 B2
(45) Date of Patent: Jan. 12, 2016

(54) ELECTRICALLY POWERED VEHICLE AND METHOD FOR CONTROLLING ELECTRICALLY POWERED VEHICLE

(75) Inventor: Hidetoshi Kusumi, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 220 days.

(21) Appl. No.: 14/124,401

(22) PCT Filed: Jun. 7, 2011

(86) PCT No.: PCT/JP2011/063029
§ 371 (c)(1),
(2), (4) Date: Dec. 6, 2013

(87) PCT Pub. No.: WO2012/169009
PCT Pub. Date: Dec. 13, 2012

(65) Prior Publication Data
US 2014/0097676 A1  Apr. 10, 2014

(51) Int. Cl.
B60L 7/14 (2006.01)
H02J 7/04 (2006.01)
H02J 7/14 (2006.01)
B60L 7/10 (2006.01)
B60L 11/18 (2006.01)
H02J 7/02 (2006.01)
B60L 11/12 (2006.01)
B60L 11/14 (2006.01)

(52) U.S. Cl.
CPC ... *B60L 7/14* (2013.01); *B60L 7/10* (2013.01); *B60L 11/123* (2013.01); *B60L 11/14* (2013.01); *B60L 11/1816* (2013.01); *B60L 11/1857* (2013.01); *B60L 11/1861* (2013.01); *B60L 11/1862* (2013.01); *H02J 7/02* (2013.01); *H02J 7/045* (2013.01); *H02J 7/14* (2013.01); *Y02T 10/7005* (2013.01); *Y02T 10/705* (2013.01); *Y02T 10/7044* (2013.01)

(58) Field of Classification Search
None
See application file for complete search history.

(56) References Cited

U.S. PATENT DOCUMENTS 5,507,153 A    4/1996  Seto et al.
7,019,472 B2 *  3/2006  Kayukawa ............... B60K 6/48
                                                            318/139

(Continued)

FOREIGN PATENT DOCUMENTS

| JP | 05-284607 A | 10/1993 |
| JP | 2003-125501 A | 4/2003 |
| JP | 2003-134602 A | 5/2003 |
| JP | 2003199211 A | 7/2003 |
| JP | 2005-065352 A | 3/2005 |
| JP | 2005130629 A | 5/2005 |

(Continued)

*Primary Examiner* — Rexford Barnie
*Assistant Examiner* — David Shiao
(74) *Attorney, Agent, or Firm* — Kenyon & Kenyon LLP

(57) ABSTRACT

A charging control unit sets a fully charged state of a power storage device so as to have a margin for a fully charged capacity of the power storage device. The charging control unit sets the fully charged state to be variable in accordance with a degree of deterioration of the power storage device such that the margin becomes smaller as the degree of deterioration of the power storage device is larger. A traveling control unit switches between first control and second control in accordance with a degree of decrease of the margin when regenerative electric power exceeds a charging power upper limit value, the first control being control for regenerating, to the power storage device, an excess of the regenerative electric power relative to the charging power upper limit value, the second control being control for consuming the excess of the regenerative electric power using an auxiliary load.

4 Claims, 10 Drawing Sheets

(56) References Cited

U.S. PATENT DOCUMENTS

| | | | |
|---|---|---|---|
| 8,288,998 B2 * | 10/2012 | Masuda | H01M 10/486 180/65.1 |
| 8,710,795 B2 * | 4/2014 | Scheucher | B60L 11/1861 320/104 |
| 2002/0157882 A1 * | 10/2002 | Kubo | B60K 6/28 180/65.26 |
| 2007/0018608 A1 | 1/2007 | Okumura | |
| 2011/0001352 A1 * | 1/2011 | Tamura | B60R 16/033 307/9.1 |
| 2011/0156644 A1 * | 6/2011 | Arai | B60L 3/0046 320/109 |
| 2012/0016547 A1 | 1/2012 | Aridome et al. | |
| 2012/0283903 A1 | 11/2012 | Kusumi et al. | |

FOREIGN PATENT DOCUMENTS

| | | | |
|---|---|---|---|
| JP | 2005137091 A | 5/2005 | |
| JP | 2006-174543 A | 6/2006 | |
| JP | 2008189121 A | 8/2008 | |
| JP | 2008308122 A | 12/2008 | |
| JP | 2009-196404 A | 9/2009 | |
| JP | 2009274549 A | 11/2009 | |
| JP | 2010088206 A | 4/2010 | |
| JP | 2010119180 A | 5/2010 | |
| WO | 94/21481 A1 | 9/1994 | |
| WO | 2010/100736 A1 | 10/2010 | |
| WO | WO 2010146681 A1 * | 12/2010 | B60L 3/0046 |
| WO | 2011/061810 A1 | 5/2011 | |

* cited by examiner

ELECTRICALLY POWERED VEHICLE AND METHOD FOR CONTROLLING ELECTRICALLY POWERED VEHICLE

CROSS-REFERENCE TO RELATED APPLICATIONS

This is a national phase application based on the PCT International Patent Application No. PCT/JP2011/063029 filed on Jun. 7, 2011, the entire contents of which are incorporated herein by reference.

TECHNICAL FIELD

The present invention relates to an electrically powered vehicle and a method for controlling the electrically powered vehicle, more particularly, charging control for a power storage device provided in the electrically powered vehicle.

BACKGROUND ART

An electrically powered vehicle configured to be capable of generating vehicle driving power using a motor, such as an electric vehicle, a hybrid vehicle, or a fuel cell vehicle, is provided with a power storage device that stores electric power for driving the motor. In such an electrically powered vehicle, during starting or acceleration, electric power is supplied from the power storage device to the motor so as to generate vehicle driving power. On the other hand, during traveling on a downhill or deceleration, electric power generated by regenerative braking of the motor is supplied to the power storage device. Accordingly, the power storage device is repeatedly discharged and charged during vehicle traveling, so that control is required to manage a state of charge (hereinafter, also simply referred to as "SOC") of the power storage device during the vehicle traveling. It should be noted that the SOC represents a ratio of a currently remaining capacity to a fully charged capacity. Generally, charging/discharging of the power storage device is controlled such that the SOC does not fall out of a predetermined control range.

As one manner of such SOC control for the electrically powered vehicle, Japanese Patent Laying-Open No. 2003-134602 (PTD 1) discloses a regenerative energy control device for a hybrid vehicle configured to store regenerative energy, which is generated during regenerative operation of the motor for driving, in a battery as electric energy. According to Japanese Patent Laying-Open No. 2003-134602 (PTD 1), when the battery cannot recover the regenerative energy, the motor for electric power generation is controlled to flow, in the motor for electric power generation, a d-axis current having a magnitude corresponding to the amount of regenerative energy that cannot be recovered by the battery. In this way, the excess of the electric energy can be recovered as heat loss of the motor for electric power generation.

Further, Japanese Patent Laying-Open No. 2009-196404 (PTD 2) discloses a hybrid control device configured to consume an excess of electric power using an air conditioning device, when electric power generated by regenerative braking of the motor exceeds permissible charging power for the battery.

CITATION LIST

Patent Document

PTD 1: Japanese Patent Laying-Open No. 2003-134602
PTD 2: Japanese Patent Laying-Open No. 2009-196404
PTD 3: Japanese Patent Laying-Open No. 2005-65352
PTD 4: Japanese Patent Laying-Open No. 2003-125501
PTD 5: Japanese Patent Laying-Open No. 2006-174543

SUMMARY OF INVENTION

Technical Problem

In each of PTDs 1 and 2, even when the power storage device of the vehicle cannot recover the electric power generated by the regenerative braking of the motor, the excess of the electric power is consumed by the motor for electric power generation or by the air conditioning device, thereby securing desired braking power.

Here, it is known that performance of a secondary battery, which is representatively used as the power storage device, is decreased as deterioration thereof proceeds. For example, when the fully charged capacity of the secondary battery is decreased as the deterioration thereof proceeds. Accordingly, unless regenerative control for the motor is performed sufficiently in a reflection of the deterioration of the performance, desired braking power cannot be secured when the performance of the power storage device is deteriorated (when the fully charged capacity is decreased). This may result in bad feeling during braking.

Further, as years of utilization of the power storage device become longer, the fully charged capacity thereof is decreased, with the result that the electrically powered vehicle can possibly travel a shorter distance (hereinafter, also referred to as "cruising distance of the electrically powered vehicle") using the electric power stored in the secondary battery. Accordingly, the deterioration of the power storage device also needs to be reflected in the control for the SOC of the power storage device.

Accordingly, the present invention has been made to solve such a problem and has an object to perform regenerative control for a motor in a reflection of deterioration of a power storage device of a vehicle without bad feeling during braking.

Solution to Problem

According to a certain aspect of the present invention, an electrically powered vehicle includes: a chargeable/dischargeable power storage device; a motor configured to generate vehicle driving power when receiving electric power supplied from the power storage device, and to regenerate electric power, which is generated during regenerative braking of the vehicle, to the power storage device; an auxiliary load; a charging control unit that sets a fully charged state of the power storage device so as to have a margin for a fully charged capacity of the power storage device, and that sets a charging power upper limit value permitted in the power storage device, in accordance with an upper limit value of a charge state value of the power storage device, the upper limit value of the charge state value being defined to be associated with the fully charged state; and a traveling control unit that controls charging power for the power storage device within a range defined by the charging power upper limit value. The charging control unit sets the fully charged state to be variable in accordance with a degree of deterioration of the power storage device such that the margin becomes smaller as the degree of deterioration of the power storage device is larger. The traveling control unit switches between first control and second control in accordance with a degree of decrease of the margin when electric power generated by the motor during regenerative braking of the vehicle exceeds the charging power upper limit value, the first control being control for regenerating, to the power storage device, an excess of the electric power relative to the charging power upper limit value, the second control being control for consuming the excess of the electric power relative to the charging power upper limit value using the auxiliary load.

Preferably, the charging control unit sets the upper limit value of the charge state value, assuming that a predetermined reference capacity corresponds to the fully charged state, and when the fully charged capacity reaches the reference capacity, the charging control unit sets the upper limit value of the charge state value by changing the fully charged state from the reference capacity to the fully charged capacity. The traveling control unit performs the first control until the fully charged capacity is decreased to the reference capacity, and performs the second control after the fully charged capacity is decreased to the reference capacity.

Preferably, until the fully charged capacity is decreased to the reference capacity, the charging control unit sets the upper limit value of the charge state value to be variable such that the upper limit value of the charge state value is a higher value as the degree of deterioration of the power storage device is larger, and after the fully charged capacity is decreased to the reference capacity, the charging control unit maintains the upper limit value of the charge state value at a predetermined value defined to be associated with the fully charged state. The traveling control unit performs the first control until the upper limit value of the charge state value reaches the predetermined value, and the traveling control unit performs the second control after the upper limit value of the charge state value reaches the predetermined value.

According to another aspect of the present invention, there is provided a method for controlling an electrically powered vehicle. The electrically powered vehicle includes: a chargeable/dischargeable power storage device; a motor configured to generate vehicle driving power when receiving electric power supplied from the power storage device, and to regenerate electric power, which is generated during regenerative braking of the electrically powered vehicle, to the power storage device; and an auxiliary load. The method includes the steps of setting a fully charged state of the power storage device so as to have a margin for a fully charged capacity of the power storage device, and setting a charging power upper limit value permitted in the power storage device, in accordance with an upper limit value of a charge state value of the power storage device, the upper limit value of the charge state value being defined to be associated with the fully charged state; and controlling charging power for the power storage device within a range defined by the charging power upper limit value. The step of setting the charging power upper limit value sets the fully charged state to be variable in accordance with a degree of deterioration of the power storage device such that the margin becomes smaller as the degree of deterioration of the power storage device is larger. The step of controlling the charging power switches between first control and second control in accordance with a degree of decrease of the margin when electric power generated by the motor during regenerative braking of the electrically powered vehicle exceeds the charging power upper limit value, the first control being control for regenerating, to the power storage device, an excess of the electric power relative to the charging power upper limit value, the second control being control for consuming the excess of the electric power relative to the charging power upper limit value using the auxiliary load.

Advantageous Effects of Invention

According to the present invention, by performing the charging control for the power storage device of the vehicle and the regenerative control for the motor in a reflection of the degree of deterioration of the power storage device, the cruising distance of the electrically powered vehicle can be secured while preventing feeling from being bad during braking.

DESCRIPTION OF EMBODIMENTS

Figure 1:
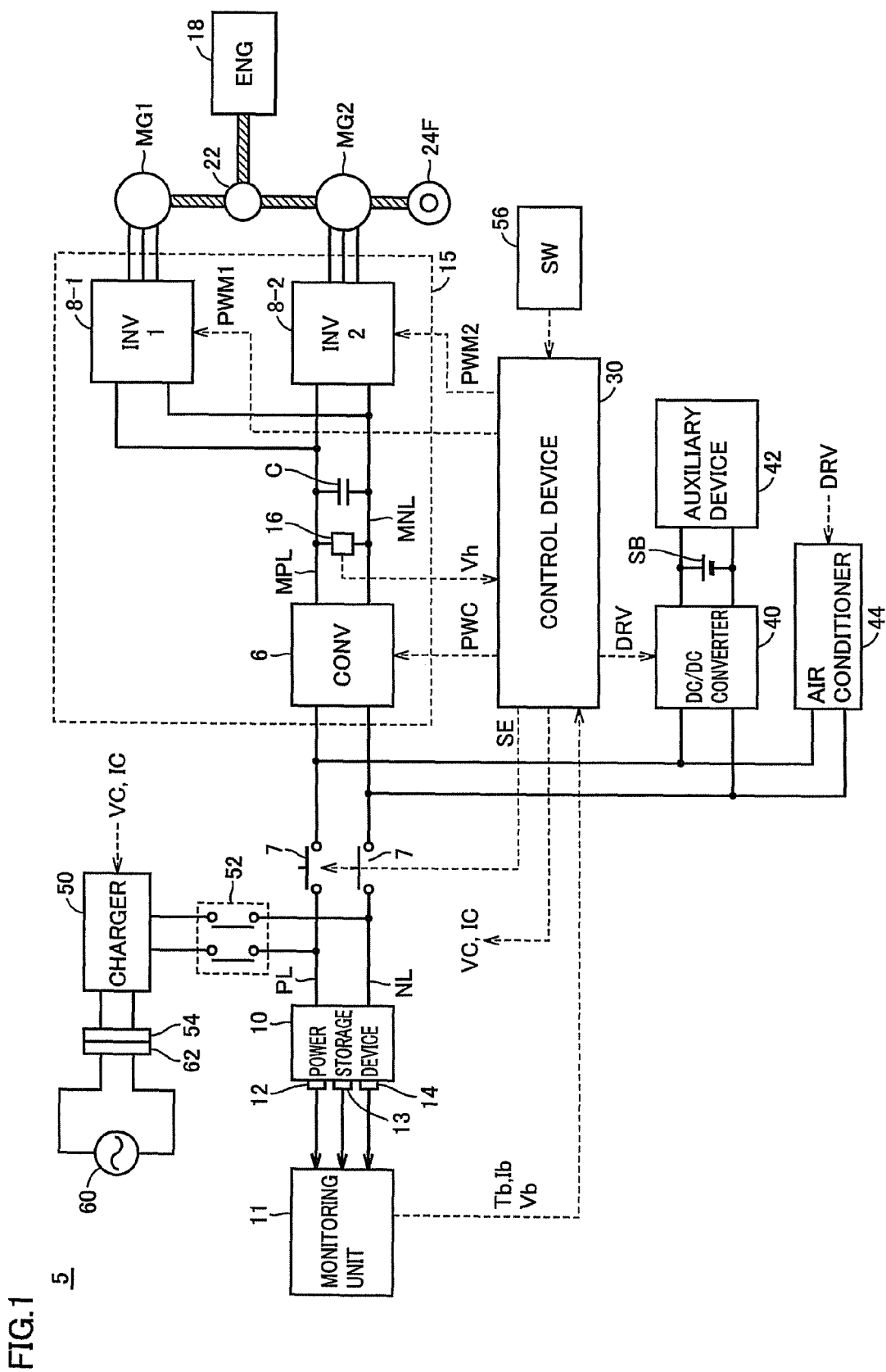
FIG. 1 is a schematic configuration diagram of a hybrid vehicle illustrated as a representative example of an electrically powered vehicle in an embodiment of the present invention.

The following describes an embodiment of the present invention in detail with reference to figures. It should be noted that the same or corresponding portions in the figures are given the same reference characters and are not described repeatedly.

FIG. 1 is a schematic configuration diagram of a hybrid vehicle 5 illustrated as a representative example of an electrically powered vehicle according to the embodiment of the present invention.

Referring to FIG. 1, hybrid vehicle 5 includes an engine (internal combustion engine) 18 and motor generators MG1, MG2. Hybrid vehicle 5 further includes a power storage device 10 capable of supplying/receiving electric power to/from motor generators MG1, MG2.

Power storage device 10 is a re-dischargeable power storage element. Representatively, a secondary battery is applied thereto, such as a lithium ion battery or a nickel hydride battery. Alternatively, power storage device 10 may be constructed of a power storage element other than a battery, such as an electric double layer capacitor. FIG. 1 shows a system configuration associated with charging/discharging control for power storage device 10 in hybrid vehicle 5.

A monitoring unit 11 detects a "state value" of power storage device 10 based on respective outputs of a temperature sensor 12, a voltage sensor 13, and a current sensor 14 provided in power storage device 10. Specifically, the "state value" includes temperature Tb, voltage Vb, and current Ib of power storage device 10. Because the secondary battery is representatively used as power storage device 10 as described above, temperature Tb, voltage Vb, and current Ib of power storage device 10 will be also referred to as "battery temperature Tb", "battery voltage Vb", and "battery current Ib". Furthermore, battery temperature Tb, battery voltage Vb, and battery current Ib are also collectively referred to as "battery data".

Temperature sensor 12, voltage sensor 13, and current sensor 14 comprehensively represent temperature sensors, voltage sensors, and current sensors provided in power storage device 10, respectively. In other words, actually, a plurality of temperature sensors 12, voltage sensors 13, and/or current sensors 14 are generally provided.

Engine 18 and motor generators MG1 and MG2 are mechanically coupled to one another via a power split device 22.

Figure 2:
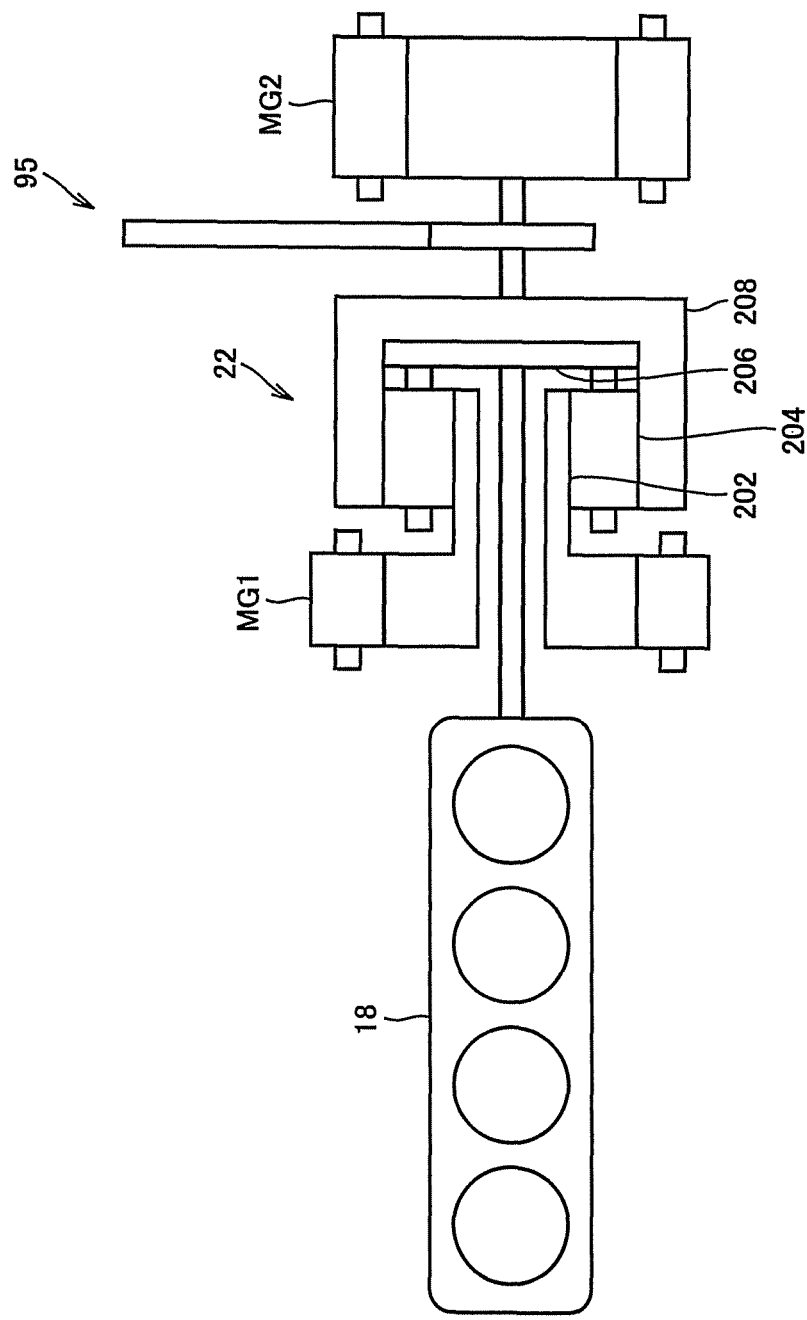
FIG. 2 is a schematic diagram of a power split device shown in FIG. 1.

Referring to FIG. 2, power split device 22 will be described more. Power split device 22 is constituted of a planetary gear including a sun gear 202, pinion gears 204, a carrier 206, and a ring gear 208.

Pinion gears 204 engage with sun gear 202 and ring gear 208. Carrier 206 rotatably supports pinion gears 204. Sun gear 202 is coupled to a rotation shaft of motor generator MG1. Carrier 206 is coupled to a crankshaft of engine 18. Ring gear 208 is coupled to a rotation shaft of motor generator MG2 and a speed reducing shaft 95.

Figure 3:
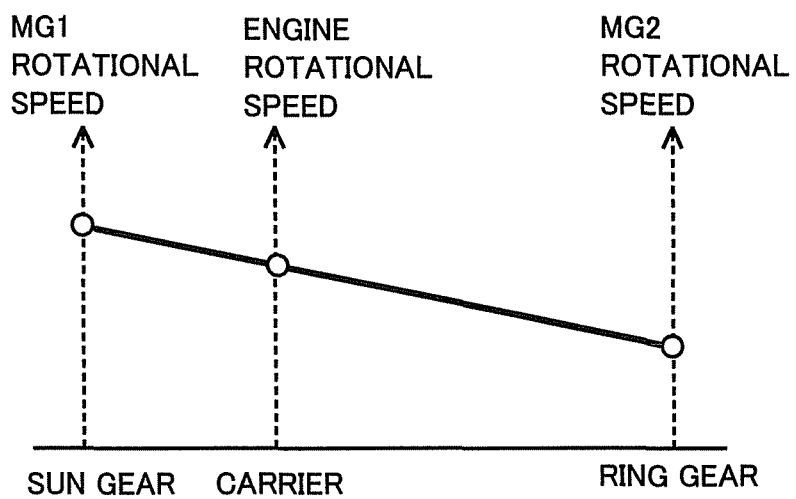
FIG. 3 is a nomographic chart of the power split device.

Engine 18, motor generator MG1, and motor generator MG2 are coupled to one another via power split device 22 constituted of the planetary gear. Accordingly, rotational speeds of engine 18, motor generator MG1, and motor generator MG2 are in a relation such that they are connected to one another in a straight line in a nomographic chart as shown in FIG. 3.

As a result, during traveling of hybrid vehicle 5, power split device 22 splits driving power generated by operation of engine 18 into two, one of which is distributed to motor generator MG1 and the other of which is distributed to motor generator MG2. The driving power distributed from power split device 22 to motor generator MG1 is used for an operation of generating electric power. On the other hand, the driving power distributed to motor generator MG2 is combined with driving power generated by motor generator MG2, and is then used to drive driving wheels 24F.

As such, in accordance with a traveling state of hybrid vehicle 5, the driving power is distributed and combined among the above-described three components by means of power split device 22, thereby driving driving wheels 24F. Further, during traveling of hybrid vehicle 5, power storage device 10 can be charged with electric power generated by motor generator MG1 using an output of engine 18.

Referring to FIG. 1 again, hybrid vehicle 5 further includes a power control unit 15. Power control unit 15 is configured to bidirectionally convert electric power between power storage device 10 and each of motor generator MG1 and motor generator MG2. Power control unit 15 includes a converter (CONV) 6, and a first inverter (INV1) 8-1 and a second inverter (INV2) 8-2 respectively associated with motor generators MG1 and MG2.

Converter (CONV) 6 is configured to bidirectionally convert DC voltage between power storage device 10 and a positive bus MPL, which transfers a DC link voltage of each of inverters 8-1, 8-2. Namely, the input/output voltage of power storage device 10 and the DC voltage between positive bus MPL and negative bus MNL are bidirectionally stepped up or down. The operation of stepping up or down in converter 6 is controlled in accordance with a switching command PWC from control device 30. Further, a smoothing capacitor C is connected between positive bus MPL and negative bus MNL. Further, DC voltage Vh between positive bus MPL and negative bus MNL is detected by a voltage sensor 16.

Each of first inverter 8-1 and second inverter 8-2 bidirectionally converts electric power between the DC power of positive bus MPL and negative bus MNL and the AC power supplied to/from motor generators MG1 and MG2. Mainly, in accordance with a switching command PWM1 from control device 30, first inverter 8-1 converts AC power generated by motor generator MG1 using output of engine 18 into DC power, and supplies it to positive bus MPL and negative bus MNL. In this way, also during vehicle traveling, power storage device 10 can be actively charged using output of engine 18.

Further, when starting engine 18, in accordance with switching command PWM1 from control device 30, first inverter 8-1 converts DC power supplied from power storage device 10 into AC power, and supplies it to motor generator MG1. In this way, engine 18 can be started using motor generator MG1 as a starter.

In accordance with a switching command PWM2 from control device 30, second inverter 8-2 converts DC power supplied via positive bus MPL and negative bus MNL into AC power, and supplies it to motor generator MG2. In this way, motor generator MG2 generates driving power for hybrid vehicle 5.

Meanwhile, during regenerative braking of hybrid vehicle 5, motor generator MG2 generates AC power as the speed of driving wheels 24F is reduced. In doing so, in accordance with switching command PWM2 from control device 30, second inverter 8-2 converts the AC power generated by motor generator MG2 to DC power, and supplies it to positive bus MPL and negative bus MNL. Accordingly, during deceleration or traveling on a downhill, power storage device 10 is charged.

Between power storage device 10 and power control unit 15, a system main relay 7 is provided which is inserted in and connected to positive line PL and negative line NL. System main relay 7 is turned on/off in response to a relay control signal SE from control device 30. System main relay 7 is employed as a representative example of an "opening/closing device" capable of interrupting the charging/discharging path for power storage device 10. Any type of opening/closing device can be employed instead of system main relay 7.

Hybrid vehicle 5 further includes a DC/DC converter 40, an auxiliary device 42, an auxiliary battery SB, and an air conditioner 44. DC/DC converter 40 is connected to positive line PL and negative line NL both connected to power storage device 10. DC/DC converter 40 converts the voltage level of a DC voltage received from power storage device 10 or converter 6, and supplies it to auxiliary battery SB. Auxiliary device 42 is supplied with the DC voltage as a power source voltage from DC/DC converter 40. Air conditioner 44 is connected to positive line PL and negative line NL. Air conditioner 44 is driven using the DC voltage received from power storage device 10 or converter 6. It should be noted that auxiliary device 42 and air conditioner 44 representatively represent an auxiliary load operated using the DC voltage received from power storage device 10 or converter 6.

Hybrid vehicle 5 further includes a charging relay 52, a charger 50, and a connector receiving portion 54, as a configuration for charging power storage device 10 using electric power from a power source (hereinafter, also referred to as "external power source") external to the vehicle such as a commercial power source (so-called "plug-in charging"). Connector portion 62 is connected to connector receiving portion 54, thereby supplying electric power from commercial power source 60 to charger 50. Commercial power source 60 is an AC power source of 100V, for example. Control device 30 instructs charger 50 on charging current IC and charging voltage VC. Charger 50 converts AC into DC, adjusts the voltage, and feeds it to power storage device 10. It should be noted that in order to achieve external charging, there can be employed a method in which the neutral point of the stator coils of motor generators MG1, MG2 may be connected to an AC power source. Alternatively, hybrid vehicle 5 may be configured to receive electric power supplied from the external power source by means of electromagnetic coupling without contact between the external power source and the vehicle, specifically, may be configured to receive electric power by means of mutual conductance between a primary coil provided at the external power source side and a secondary coil provided at the vehicle side.

Hybrid vehicle 5 further includes a switch 56 configured to be operable by a user. Switch 56 is switched between ON state and OFF state by manual operation of the user. When switch 56 is brought into ON state by the user, a command (signal SLF) is generated to set a charging mode of power storage device 10 so as to suppress progression of deterioration of power storage device 10. By suppressing the progression of deterioration of power storage device 10, utilization period of power storage device 10 can be made longer. In other words, signal SLF is a command for attaining a longer utilization period of power storage device 10. In the description below, the charging mode for suppressing the progression of deterioration of power storage device 10 is also referred to as "long life mode".

When switch 56 is brought into OFF state by the user, the generation of signal SLF is stopped. In this way, the setting of the long life mode is canceled and hybrid vehicle 5 is switched from the long life mode to a normal mode. Specifically, by turning on or off switch 56, the user can select one of the long life mode and the normal mode as the charging mode of hybrid vehicle 5.

Control device 30 is representatively constituted of an electronic control unit (ECU). The ECU is mainly constituted of a CPU (Central Processing Unit); a memory region such as a RAM (Random Access Memory) or a ROM (Read Only Memory); and an input/output interface. In control device 30, the CPU reads out, to the RAM, a program stored in advance in the ROM and executes it, thereby performing control associated with the vehicle traveling and the charging/discharging. It should be noted that at least a part of the ECU may be configured to perform predetermined mathematical/logical calculation using hardware such as an electronic circuit.

As exemplary information sent to control device 30, FIG. 1 illustrates the battery data (battery temperature Tb, battery voltage Vb, and battery current Ib), DC voltage Vh and signal SLF. The battery data is provided from monitoring unit 11, DC voltage Vh is provided from voltage sensor 16 positioned between the lines of positive bus MPL and negative bus MNL, and signal SLF is provided from switch 56. Although not shown in the figure, a current detection value of each phase of motor generators MG1, MG2 and a rotation angle detection value of each of motor generators MG1, MG2 are also sent to control device 30.

Figure 4:
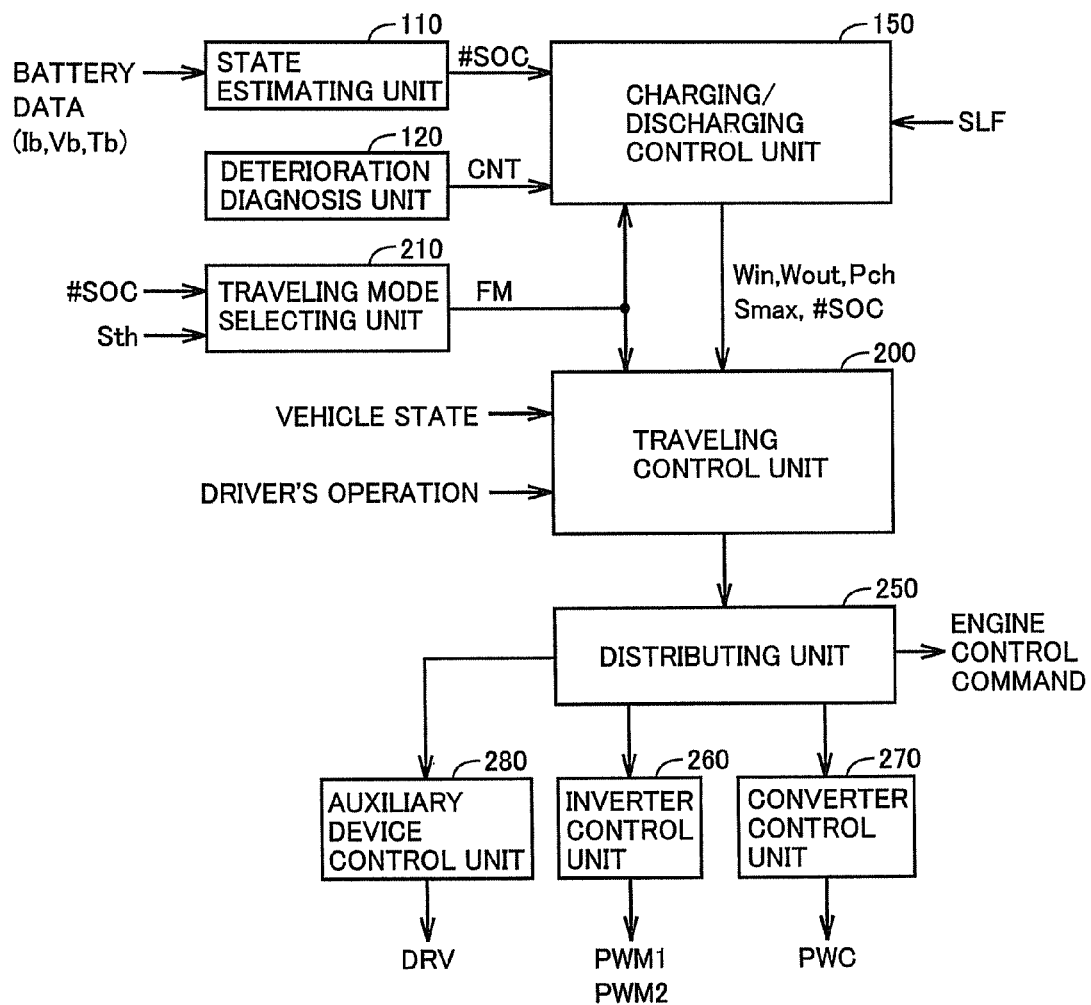
FIG. 4 is a function block diagram illustrating charging/discharging control for a power storage device provided in the electrically powered vehicle according to the embodiment of the present invention.

FIG. 4 is a function block diagram illustrating charging/discharging control for the power storage device in the electrically powered vehicle according to the embodiment of the present invention. It should be noted that each functional block in each of the below-mentioned block diagrams inclusive of FIG. 4 can be implemented by control device 30 performing software processing in accordance with a program set in advance. Alternatively, a circuit (hardware) having a function corresponding to the function can be provided in control device 30.

Referring to FIG. 4, a state estimating unit 110 estimates a state of charge (SOC) of power storage device 10 based on the battery data (Tb, Vb, Ib,) sent from monitoring unit 11. The SOC represents a ratio of a currently remaining capacity to a fully charged capacity (0% to 100%). For example, state estimating unit 110 sequentially calculates an SOC estimate value (#SOC) of power storage device 10 based on an integrated value of the charging amount and discharging amount of power storage device 10. The integrated value of the charging amount and discharging amount is obtained by temporally integrating a product (electric power) of battery current Ib and battery voltage Vb. Alternatively, the SOC estimate value (#SOC) may be found based on a relation between an open circuit voltage (OCV) and the SOC.

Deterioration diagnosis unit 120 measures years of utilization of power storage device 10 as a parameter used to estimate a degree of deterioration of power storage device 10. The deterioration of power storage device 10 proceeds as the years of utilization become longer. When the deterioration of power storage device 10 proceeds, the fully charged capacity of power storage device 10 is decreased and the internal resistance is increased. It should be noted that factors for the deterioration of power storage device 10 include not only the years of utilization of power storage device 10 but also traveling distance of hybrid vehicle 5. Hence, deterioration diagnosis unit 120 may measure a traveling distance of hybrid vehicle 5 instead of the years of utilization of power storage device 10, as a parameter for estimating the degree of deterioration (degree of decrease of fully charged capacity and degree of increase of internal resistance). Alternatively, the years of utilization of power storage device 10 and the traveling distance of hybrid vehicle 5 may be measured. It should be noted that the years of utilization of power storage device 10 and the traveling distance of the vehicle can be calculated using well-known various methods.

The SOC estimate value (#SOC) calculated by state estimating unit 110 and years of utilization CNT of power storage device 10 measured by deterioration diagnosis unit 120 are sent to a charging/discharging control unit 150.

Based on the state of power storage device 10, charging/discharging control unit 150 sets maximum charging and discharging power values permitted in power storage device 10 (charging power upper limit value Win and discharging power upper limit value Wout). Further, charging/discharging control unit 150 determines whether or not power storage device 10 needs to be charged, and sets a charging power command value Pch for power storage device 10. Charging power command value Pch is set to satisfy Pch=0 when power storage device 10 does not need to be charged. On the other hand, when it is determined that power storage device 10 needs to be charged, charging power command value Pch is set to satisfy Pch>0.

A traveling control unit 200 calculates vehicle driving power and vehicle braking power required in the entire hybrid vehicle 5, in accordance with the vehicle state of hybrid vehicle 5 and a driver's operation. The driver's operation includes an amount of stepping on an accelerator pedal (not shown), a position of a shift lever (not shown), an amount of stepping on a brake pedal (not shown), and the like.

Further, traveling control unit 200 determines output requests for motor generators MG1, MG2 and an output request for engine 18 in order to achieve the requested vehicle driving power or vehicle braking power. Hybrid vehicle 5 can travel only using the output of motor generator MG2 with engine 18 being stopped. Hence, by determining each of the output requests so as to avoid operation of engine 18 in a region with bad fuel consumption, energy efficiency can be increased. Further, the output requests for motor generators MG1, MG2 are set with charging/discharging of power storage device 10 being restricted in the range of electric power (Win to Wout) chargeable/dischargeable to/from power storage device 10. In other words, when the output electric power of power storage device 10 cannot be secured, the output of motor generator MG2 is restricted.

Here, during regenerative braking of hybrid vehicle 5, traveling control unit 200 determines regenerative braking power to be generated by motor generator MG2 so as to achieve the requested vehicle braking power. On this occasion, when it is determined that regenerative electric power generated by motor generator MG2 due to deceleration of driving wheels 24F exceeds charging power upper limit value Win of power storage device 10, traveling control unit 200 selects, in accordance with the degree of deterioration of power storage device 10 by means of a below-described method, a component that will recover an excess of regenerative electric power relative to charging power upper limit value Win. When the auxiliary load (such as auxiliary device 42 and air conditioner 44) is selected as the component that will recover the excess of regenerative electric power, traveling control unit 200 generates an auxiliary device operating command to request operations of DC/DC converter 40 and air conditioner 44.

In accordance with the output requests for motor generators MG1, MG2 set by traveling control unit 200, a distributing unit 250 calculates torques and rotational speeds of motor generators MG1, MG2. Then, distributing unit 250 sends control commands regarding the torques and rotational speeds to an inverter control unit 260, and at the same time, sends a control command value regarding voltage Vh to a converter control unit 270.

Meanwhile, distributing unit 250 generates engine control commands indicating engine power and engine target rotational speed determined by traveling control unit 200. In accordance with each of the engine control commands, fuel injection, ignition timing, valve timing, and the like in engine 18 are controlled although they are not shown in the figures.

Further, distributing unit 250 sends the auxiliary device operating command generated by traveling control unit 200 to auxiliary device control unit 280.

Inverter control unit 260 generates, in accordance with the control commands from distributing unit 250, switching commands PWM1 and PWM2 for driving motor generators MG1 and MG2. Switching commands PWM1 and PWM2 are respectively sent to inverters 8-1 and 8-2.

Converter control unit 270 generates a switching command PWC in accordance with the control command from distributing unit 250, so as to control DC voltage Vh. In accordance with switching command PWC, converter 6 converts voltage so as to control electric power charged to and discharged from power storage device 10.

In accordance with the auxiliary device operating command from distributing unit 250, auxiliary device control unit 280 generates a control signal DRV for operating DC/DC converter 40 and air conditioner 44. This control signal DRV is sent to DC/DC converter 40 and air conditioner 44.

In this way, traveling control for hybrid vehicle 5 is achieved to improve energy efficiency in accordance with the vehicle state and the driver's operation.

In the electrically powered vehicle according to the embodiment of the present invention, power storage device 10 can be charged using engine 18 and motor generator MG1 during vehicle traveling and can be charged using motor generator MG2 during regenerative braking of the vehicle. After ending the traveling, power storage device 10 can be charged in a plug-in manner. In the description below, charging power storage device 10 using the external power source (commercial power source 60) is also referred to as "external charging", and charging power storage device 10 using engine 18 and motor generator MG1 during vehicle traveling and charging power storage device 10 using motor generator MG2 during regenerative braking of the vehicle are also referred to as "internal charging" for discrimination of the respective charging operations.

In such a plug-in type electrically powered vehicle, it is preferable to maintain engine 18 in a nonoperational state as much as possible during traveling for the sake of energy efficiency. Hence, in the electrically powered vehicle (hybrid vehicle 5), the "EV mode" and the "HV mode" are selectively applied.

Specifically, traveling mode selecting unit 210 selects one of the EV mode and the HV mode based on the SOC estimate value (#SOC) and a mode determination value Sth. Traveling mode selecting unit 210 generates a traveling mode flag FM indicating that one of the EV mode and the HV mode is selected. Traveling mode flag FM is sent to charging/discharging control unit 150 and traveling control unit 200.

Specifically, traveling mode selecting unit 210 selects the EV mode until the SOC estimate value (#SOC) falls below predetermined mode determination value Sth. In the EV traveling mode, hybrid vehicle 5 travels actively using electric power accumulated in power storage device 10.

In other words, in the EV mode, traveling control unit 200 determines output requests for motor generators MG1, MG2 and an output request for engine 18 such that traveling is performed basically using only driving power from motor generator MG2 with engine 18 being nonoperational. In the EV mode, traveling control unit 200 starts engine 18 when a special condition is established, such as the following condition: a condition in which the driver provides a driving power request for abrupt acceleration or the like; or a condition in which the driver provides a request irrelevant to the driving power such as catalyst warming or an air conditioning request. Namely, in the EV mode, with engine 18 being basically nonoperational, fuel consumption of hybrid vehicle 5 is improved. Hence, in the EV mode, the electric power generation operation performed by motor generator MG1, i.e., the internal charging is restricted. Accordingly, the SOC of power storage device 10 is monotonously decreased. It should be noted that the EV mode is also referred to as "CD (Charge Depleting) mode".

When the SOC estimate value (#SOC) of power storage device 10 is decreased to mode determination value Sth in the EV mode, traveling mode selecting unit 210 switches the traveling mode to the HV mode. The HV mode is also referred to as "CS (Charge Sustaining) mode". In the HV mode, the internal charging by motor generator MG1 is controlled to maintain the SOC of power storage device 10 within a certain SOC control range. Namely, engine 18 starts to operate in response to a request of the internal charging performed by motor generator MG1. It should be noted that part of driving power generated by the operation of engine 18 may be used for the traveling of hybrid vehicle 5.

In the HV mode, traveling control unit 200 determines the output requests for motor generators MG1, MG2 and the output request for engine 18 so as to optimize energy efficiency while maintaining the SOC of power storage device 10.

It should be noted that the user can forcibly select the HV mode, i.e., can cancel the selection of the EV mode by operating a selection switch (not shown) provided in the vicinity of the driver's seat. Meanwhile, when the selection switch is not operated, traveling mode selecting unit 210 automatically selects the traveling mode based on the SOC estimate value (#SOC) of power storage device 10 as described above.

Figure 5:
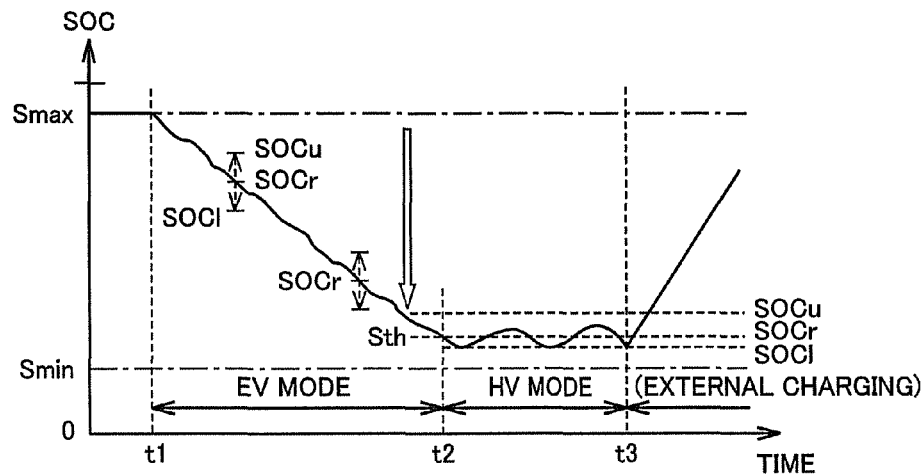
FIG. 5 shows representative transition of an SOC of the power storage device in the electrically powered vehicle of the embodiment of the present invention.

FIG. 5 shows representative transition of the SOC of power storage device 10 in the electrically powered vehicle of the embodiment of the present invention.

Referring to FIG. 5, in hybrid vehicle 5, at the start of vehicle traveling (time t1), power storage device 10 has been externally charged to a reference upper limit value Smax. Reference upper limit value Smax is a determination value for determining whether or not the SOC of power storage device 10 has reached the fully charged state.

When an ignition switch is turned on to instruct traveling of hybrid vehicle 5, the EV mode is selected because the SOC estimate value (#SOC) is higher than mode determination value Sth.

By traveling in the EV mode, the SOC of power storage device 10 is gradually decreased. In the EV mode, control center value SOCr of the SOC control range is set to correspond to the SOC estimate value (#SOC) at the present state. In other words, in the EV mode, as the SOC is decreased, the SOC control range is decreased. As a result, engine 18 is not started to internally charge power storage device 10.

When the SOC estimate value (#SOC) is decreased to mode determination value Sth (time t2), the traveling mode is changed from the EV mode to the HV mode. When transitioned to the HV mode, control center value SOCr is set at a constant value for the HV mode. Accordingly, control lower limit value SOCl is also maintained at a constant value. As a result, in the HV mode, when the SOC is decreased, engine 18 (FIG. 1) starts to operate, thereby charging power storage device 10 with electric power generated by motor generator MG1. As a result, the SOC starts to be increased and is accordingly maintained in the SOC control range (SOCl to SOCu).

When the traveling of hybrid vehicle 5 is ended, the driver connects connector portion 62 (FIG. 1) to hybrid vehicle 5, thereby starting external charging (time t3). Accordingly, the SOC of power storage device 10 starts to be increased.

By performing the external charging after the traveling of hybrid vehicle 5 in this way, power storage device 10 can be almost fully charged. Accordingly, a large amount of electric power can be derived from power storage device 10, so that a longer cruising distance of hybrid vehicle 5 can be achieved. It should be noted that the term "cruising distance" in the present specification is intended to mean a distance that can be travelled by hybrid vehicle 5 using electric power stored in power storage device 10. In particular, when a lithium ion battery having high energy density is applied as power storage device 10, a large amount of electric power can be derived from power storage device 10 and power storage device 10 can be downsized and reduced in weight.

Figure 6:
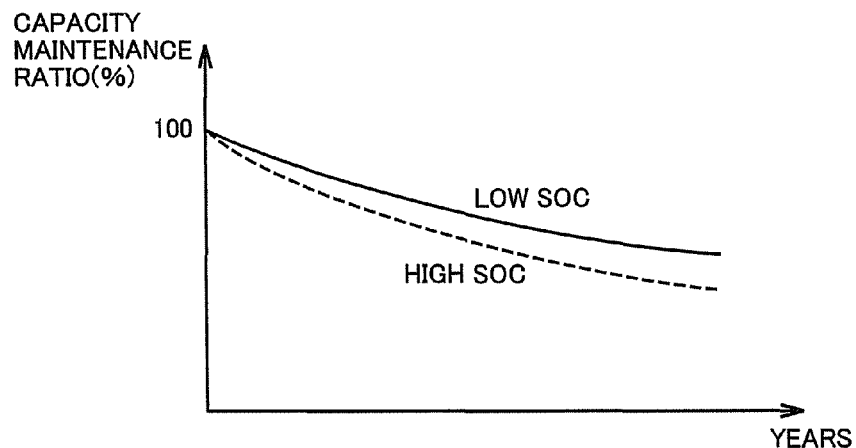
FIG. 6 illustrates a correlation between years of utilization of the lithium ion battery and a capacity maintenance ratio of the lithium ion battery.

However, generally, in view of deterioration, it is not preferable that a high SOC state is continued in the lithium ion battery for a long period of time. For example, as the deterioration of the lithium ion battery proceeds, the fully charged capacity is decreased. FIG. 6 illustrates a correlation between the years of utilization of the lithium ion battery and a capacity maintenance ratio of the lithium ion battery. Referring to FIG. 6, when the lithium ion battery is brand new, the capacity maintenance ratio is defined as "100%". With hybrid vehicle 5 repeatedly traveling using electric power stored in the lithium ion battery, the lithium ion battery gradually becomes deteriorated. As the years of utilization of the lithium ion battery become longer, the capacity maintenance ratio becomes smaller. In other words, the fully charged capacity of the lithium ion battery is decreased. Further, a degree of the decrease of the capacity maintenance ratio corresponding to the years of utilization becomes larger as the SOC is higher when completing the charging of the lithium ion battery.

Here, a period of time from the completion of charging of power storage device 10 to start of traveling of hybrid vehicle 5 differs depending on users. Hence, the high SOC state may continue for a long period of time. Accordingly, the fully charged capacity of power storage device 10 may be decreased.

The electrically powered vehicle according to the present embodiment has the long life mode for achieving a longer utilization period of power storage device 10. In view of these, in the electrically powered vehicle of the present embodiment, the SOC control for power storage device 10 is switched in the following manner between the normal mode and the long life mode.

As illustrated in FIG. 5, the control range for the SOC of power storage device 10 is set to have control widths for the upper limit side and the lower limit side relative to control center value SOCr. In the description below, the lower limit of the SOC control range is referred to as "SOCl (control lower limit value)", and the upper limit of the SOC control range is referred to as "SOCu (control upper limit value)".

For the SOC of power storage device 10, reference upper limit value Smax and reference lower limit value Smin are further set. Reference upper limit value Smax and reference lower limit value Smin respectively correspond to the fully charged state and the empty state both provided for the SOC control so as to avoid overcharging or overdischarging reaching or exceeding these values.

The SOC control range is set to fall within the range from reference lower limit value Smin to reference upper limit value Smax. Namely, control lower limit value SOCl and control upper limit value SOCu are set to have margins for reference lower limit value Smin and reference upper limit value Smax, respectively.

Reference upper limit value Smax is a determination value for determining whether or not the SOC of power storage device 10 has reached the fully charged state as described above. In the electrically powered vehicle according to the present embodiment, this reference upper limit value Smax is switched between the normal mode and the long life mode.

Figure 7:
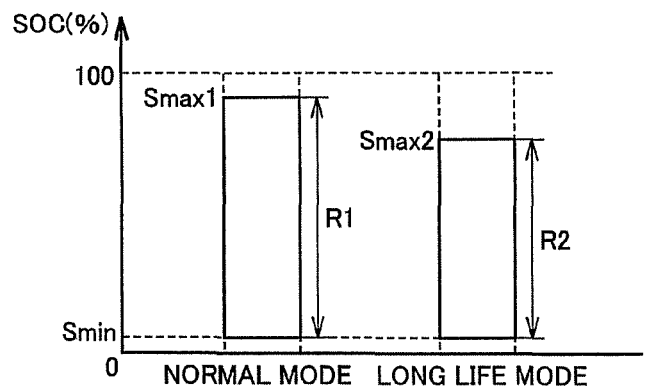
FIG. 7 illustrates setting of a reference range of the SOC in the electrically powered vehicle of the present embodiment.

Referring to FIG. 7, the following describes the setting of the reference range of the SOC in the electrically powered vehicle of the present embodiment.

Referring to FIG. 7, a first range R1 is a reference range of SOC in the normal mode. A second range R2 is a reference range of SOC in the long life mode. Smax1 represents the upper limit value of first range R1, i.e., reference upper limit value Smax in the normal mode. Smax2 represents the upper limit value of second range R2, i.e., reference upper limit value Smax in the long life mode. Further, the lower limit value of first range R1, i.e., the reference lower limit value in the normal mode, and the lower limit value of second range R2, i.e., the reference lower limit value in the long life mode are both Smin. However, the lower limit value of second range R2 may be larger than the lower limit value of first range R1.

Each of reference upper limit values Smax1 and Smax2 is set at a value smaller than 100% in order to prevent overcharging of power storage device 10. Further, reference lower limit value Smin is set at a value larger than 0% in order to prevent overdischarging of power storage device 10.

Here, reference upper limit value Smax2 in the long life mode is set at a value smaller than that of reference upper limit value Smax1 in the normal mode. Accordingly, in the long life mode, the SOC upon completion of charging of power storage device 10 can be made lower than that in the normal mode. As a result, during the long life mode, progression of deterioration of power storage device 10 can be suppressed.

When power storage device 10 is charged in the long life mode in this way, the fully charged capacity of power storage device 10 can be suppressed from being decreased. As a result, even when the years of utilization of power storage device 10 become long, the cruising distance of hybrid vehicle 5 can be secured.

Figure 8:
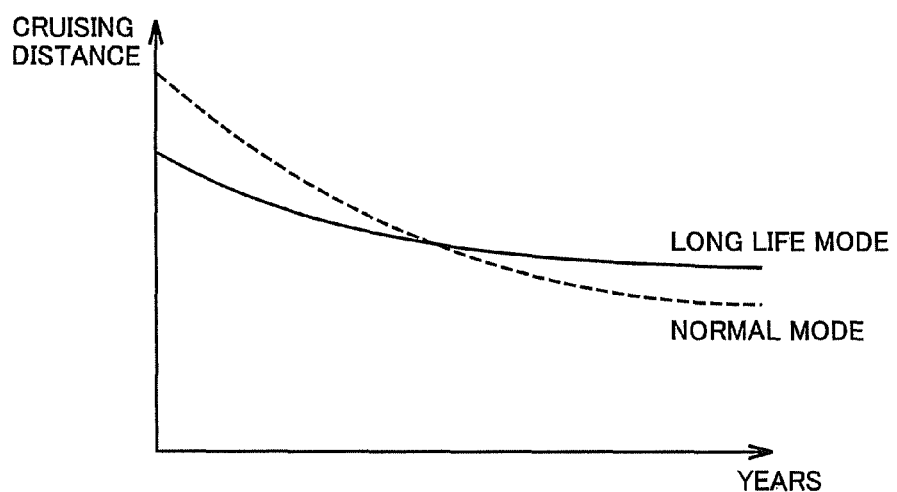
FIG. 8 illustrates a cruising distance in a long life mode and a cruising distance in a normal mode.

FIG. 8 illustrates the cruising distance in the long life mode and the cruising distance in the normal mode.

Referring to FIG. 8, when the years of utilization of power storage device 10 are short, the degree of deterioration of power storage device 10 is small, so that power storage device 10 can store a large amount of electric power. Accordingly, when the years of utilization of power storage device 10 are short, the cruising distance in the normal mode is longer than that in the long life mode.

By charging power storage device 10 assuming that reference upper limit value Smax is a limit, deterioration of power storage device 10 proceeds. However, in the long life mode, the progression of deterioration of power storage device 10 is suppressed as compared with the normal mode. Hence, even when the years of utilization of power storage device 10 become long, power storage device 10 can store a larger amount of electric power. As a result, hybrid vehicle 5 can travel a cruising distance longer than that in the normal mode.

Meanwhile, even when the long life mode is selected for the charging mode, deterioration of power storage device 10 (decrease of the fully changed capacity) proceeds as the years of utilization of power storage device 10 become longer. Accordingly, as the years of utilization of power storage device 10 become longer, the cruising distance of hybrid vehicle 5 becomes shorter.

Here, when the long life mode is selected as the charging mode of power storage device 10 in the electrically powered vehicle according to the present embodiment, reference upper limit value Smax2 is set to be variable in accordance with the degree of deterioration of power storage device 10. Specifically, in order to maintain a predetermined reference capacity of power storage device 10, as the degree of decrease of the fully charged capacity of power storage device 10 becomes larger, reference upper limit value Smax2 is increased.

Figure 9:
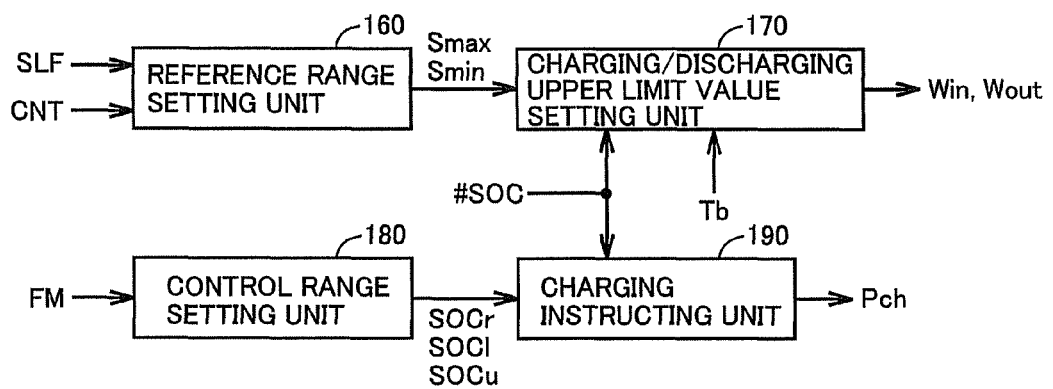
FIG. 9 is a function block diagram further illustrating a configuration of a charging/discharging control unit shown in FIG. 4.

FIG. 9 shows the configuration of charging/discharging control unit 150 (FIG. 4) more in detail.

Referring to FIG. 9, charging/discharging control unit 150 includes a reference range setting unit 160, a charging/discharging upper limit value setting unit 170, a control range setting unit 180, and a charging instructing unit 190.

Reference range setting unit 160 sets the SOC reference range (reference upper limit value Smax and reference lower limit value Smin) of power storage device 10, based on signal SLF from switch 56 and measurement value CNT of the years of utilization of power storage device 10 from deterioration diagnosis unit 120. When receiving signal SLF from switch 56, reference range setting unit 160 determines that signal SLF has been generated, i.e., determines that the long life mode has been selected as the charging mode of power storage device 10. On the other hand, when receiving no signal SLF from switch 56, reference range setting unit 160 determines that signal SLF has not been generated, i.e., determines that the normal mode has been selected as the charging mode of power storage device 10.

When the long life mode is selected as the charging mode, reference range setting unit 160 sets the reference upper limit value at Smax2 (FIG. 7). On the other hand, when the normal mode is selected as the charging mode, reference range setting unit 160 sets the reference upper limit value at Smax1 (FIG. 7).

Further, when the long life mode is selected, reference range setting unit 160 sets reference upper limit value Smax2 to be variable in accordance with measurement value CNT of the years of utilization of power storage device 10. Specifically, reference range setting unit 160 increases reference upper limit value Smax2 in accordance with increase of the years of utilization of power storage device 10.

Figure 10:
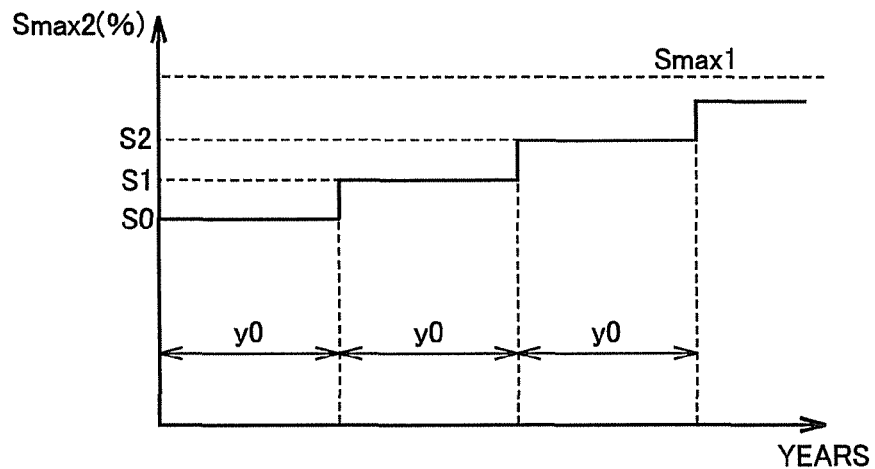
FIG. 10 is a conceptual view illustrating setting of a reference upper limit value corresponding to the years of utilization of the power storage device.

FIG. 10 is a conceptual view illustrating setting of reference upper limit value Smax2 corresponding to the years of utilization of power storage device 10.

Referring to FIG. 10, when power storage device 10 is in a brand new or equivalent state, reference upper limit value Smax2 in the long life mode is set at S0, which is a default value. S0 represents a ratio of the reference capacity to the fully charged capacity of power storage device 10 in the brand new state. The reference capacity is set at a value having a margin for the fully charged capacity. For the reference capacity, a remaining capacity C0 of power storage device 10, which is required to achieve a target value for the cruising distance of hybrid vehicle 5, is set as a default value. When the remaining capacity of power storage device 10 reaches the reference capacity, the SOC of power storage device 10 reaches reference upper limit value Smax2, so that it is determined that power storage device 10 has reached the fully charged state. In other words, the reference capacity corresponds to a threshold value for determining whether or not power storage device 10 has reached the fully charged state.

As shown in FIG. 6, as the years of utilization of power storage device 10 become longer, the fully charged capacity of power storage device 10 is decreased. Accordingly, if reference upper limit value Smax2 is fixed at default value S0, the remaining capacity of power storage device 10 possibly becomes less than the reference capacity even though power storage device 10 is charged until the SOC reaches reference upper limit value Smax2 when the years of utilization of power storage device 10 are long. As a result, the cruising distance of hybrid vehicle 5 may not attain the desired value.

To address this, reference range setting unit 160 increases reference upper limit value Smax2 in accordance with the degree of deterioration of power storage device 10 (degree of decrease of the fully charged capacity), so as to secure the reference capacity upon completion of charging. Specifically, based on measurement value CNT from deterioration diagnosis unit 120, it is determined that the years of utilization of power storage device 10 have reached a predetermined year y0, reference range setting unit 160 increases reference upper limit value Smax2 from default value S0 to S1. S1 corresponds to a ratio of reference capacity C0 to the fully charged capacity when the years of utilization of power storage device 10 have reached year y0.

During a utilization period from year y0 to year 2y0, reference upper limit value Smax2 is maintained at S1. During this period, the fully charged capacity of power storage device 10 is decreased. When the years of utilization reaches year 2y0, reference range setting unit 160 increases reference upper limit value Smax2 from S1 to S2. S2 corresponds to a ratio of reference capacity C0 to the fully charged capacity when the years of utilization of power storage device 10 have reached year 2y0.

It should be noted that in FIG. 10, reference upper limit value Smax2 is configured to increase for every predetermined years of utilization y0, but reference upper limit value Smax2 may be increased for one time. The number of times of increasing reference upper limit value Smax2 can be determined in advance based on standard years of utilization of power storage device 10, the fully charged capacity of power storage device 10, a target cruising distance, and the like.

Figure 11:
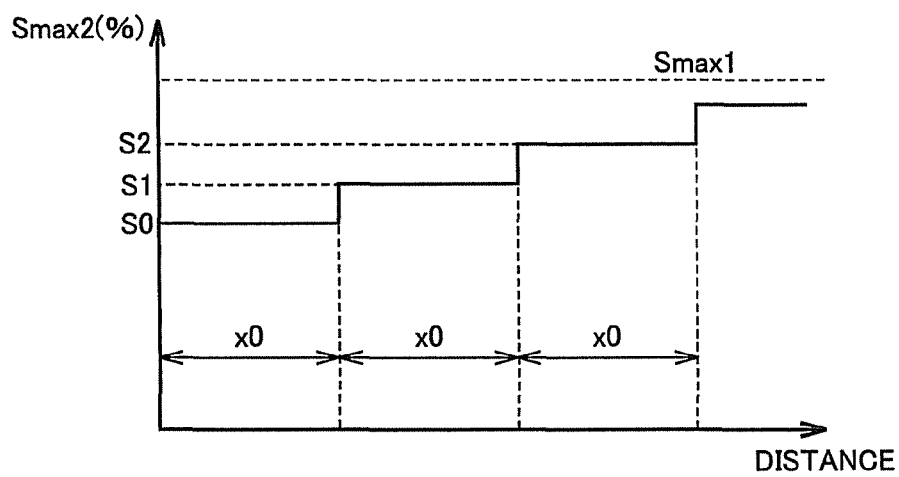
FIG. 11 is a conceptual view illustrating setting of a reference upper limit value corresponding to the traveling distance of the hybrid vehicle.

Further, as shown in FIG. 11, reference upper limit value Smax2 may be increased in accordance with the traveling distance of hybrid vehicle 5. FIG. 11 is a conceptual view illustrating setting of reference upper limit value Smax2 corresponding to the traveling distance of hybrid vehicle 5. Referring to FIG. 11, when it is determined, based on measurement value CNT of traveling distance from deterioration diagnosis unit 120, that the traveling distance of hybrid vehicle 5 has reached predetermined distance x0, reference range setting unit 160 increases reference upper limit value Smax2 from default value S0 to S1. In FIG. 11, S1 corresponds to a ratio of reference capacity C0 to the fully charged capacity when the traveling distance of hybrid vehicle 5 has reached a certain distance x0. During a period of time in which the traveling distance is from x0 to 2×0, reference upper limit value Smax2 is maintained at S1. During this period, the fully charged capacity of power storage device 10 is decreased. When the traveling distance has reached year 2×0, reference range setting unit 160 increases reference upper limit value Smax2 from S1 to S2. S2 corresponds to a ratio of reference capacity C0 to the fully charged capacity when the traveling distance of hybrid vehicle 5 has reached 2×0.

It should be noted that as with FIG. 10, also in FIG. 11, reference upper limit value Smax2 may be increased for one time instead of the configuration in which reference upper limit value Smax2 is increased for every predetermined distance x0. The number of times of increasing reference upper limit value Smax2 can be determined based on standard years of utilization of power storage device 10, the fully charged capacity of power storage device 10, a target cruising distance, and the like.

Figure 12:
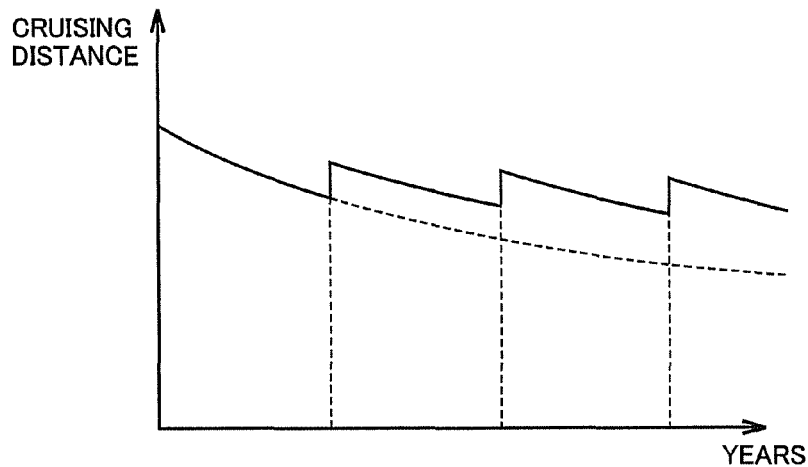
FIG. 12 is a conceptual view illustrating a cruising distance of the electrically powered vehicle, which can be achieved in accordance with the SOC control in the present embodiment.

FIG. 12 is a conceptual view illustrating a cruising distance of the electrically powered vehicle, which can be achieved in accordance with the SOC control in the present embodiment. The solid line of FIG. 12 represents the cruising distance of hybrid vehicle 5 when reference upper limit value Smax2 is increased at a predetermined timing based on the degree of deterioration of power storage device 10. The dotted line of FIG. 12 represents the cruising distance of hybrid vehicle 5 when reference upper limit value Smax2 is fixed to default value S0.

Referring to FIG. 12, in the case where reference upper limit value Smax2 is fixed to default value S0, the cruising distance is decreased as the years of utilization of power storage device 10 become longer. This is because the fully charged capacity is decreased as the years of utilization of power storage device 10 become longer. In contrast, in the case where reference upper limit value Smax2 is increased at an appropriate timing based on the degree of deterioration of power storage device 10, the remaining capacity of power storage device 10 can be maintained at reference capacity C0. Accordingly, the cruising distance can be made longer. In this way, when target years of utilization have passed, the target value of the cruising distance can be achieved.

Figure 13:
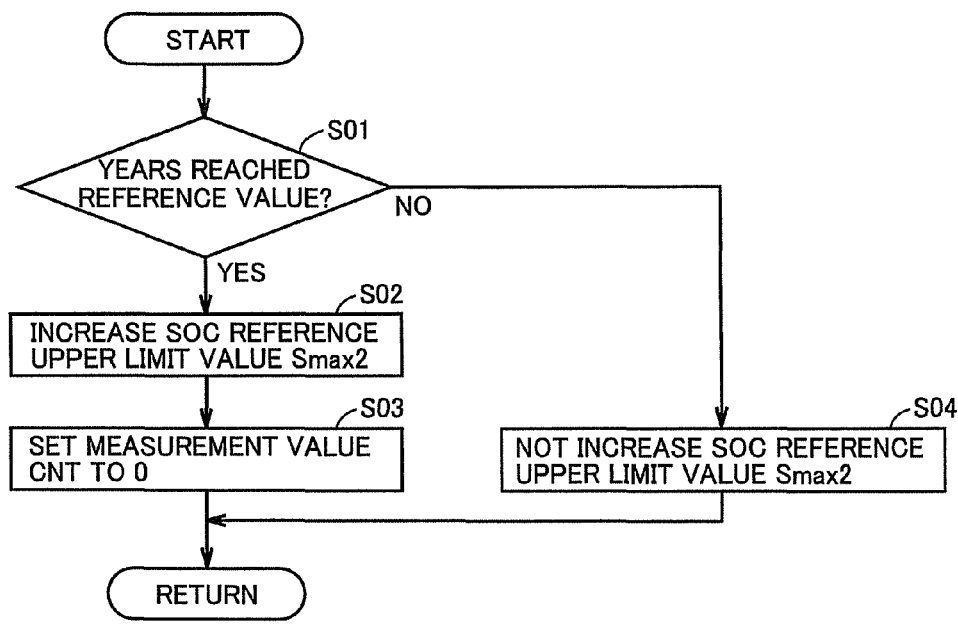
FIG. 13 is a flowchart showing a control process procedure for implementing the setting of the reference upper limit value by the reference range setting unit of FIG. 9.

FIG. 13 is a flowchart showing a control process procedure for implementing the setting of reference upper limit value Smax by reference range setting unit 160 of FIG. 9. It should be noted that the flowchart shown in FIG. 13 is performed whenever a certain period of time has passed or whenever a predetermined condition is established, in the case where the long life mode is set as the charging mode.

Referring to FIG. 13, in a step S01, reference range setting unit 160 determines, based on measurement value CNT from deterioration diagnosis unit 120, whether or not the years of utilization of power storage device 10 have reached a reference value (x0). When it is determined that the years of utilization of power storage device 10 have not reached the reference value (NO in step S01), reference range setting unit 160 does not increase reference upper limit value Smax2 in a step S04. In other words, reference upper limit value Smax2 is not changed. After the process of step S04 is ended, the overall process is brought back to the main routine.

On the other hand, when it is determined that the years of utilization of power storage device 10 have reached the reference value (YES in step S01), reference range setting unit 160 increases reference upper limit value Smax2 in a step S02. In doing so, reference range setting unit 160 increases reference upper limit value Smax2 up to a value by which reference capacity C0 can be secured.

Next, in a step S03, reference range setting unit 160 sets measurement value CNT of years of utilization of power storage device 10 to 0. When the process of step S03 is ended, the overall process is brought back to the main routine.

Referring to FIG. 9 again, at least based on battery temperature Tb and SOC estimate value (#SOC), charging/discharging upper limit value setting unit 170 sets maximum charging and discharging power values (charging power upper limit value Win and discharging power upper limit value Wout) permitted in power storage device 10. As the SOC estimate value (#SOC) is decreased, discharging power upper limit value Wout is set to be gradually decreased. In contrast, as the SOC estimate value (#SOC) is increased, charging power upper limit value Win is set to be gradually decreased.

Control range setting unit 180 sets the SOC control range of power storage device 10. The SOC control range is set to have control widths for the upper limit side and the lower limit side relative to a control center value SOCr as described above.

When the SOC estimate value (#SOC) is decreased to fall below the SOC control range set by control range setting unit 180, i.e., at least when #SOC<SOC1, charging command unit 190 commands charging of power storage device 10. In other words, Pch>0 is set. Alternatively, when SOC1<#SOC<SOCr, Pch>0 may be set in a preventive manner. When Pch>0, engine 18 is requested to operate. If engine 18 is being stopped, engine 18 is started. Then, charging power command value Pch is added to the engine output request.

Conversely, when the SOC estimate value (#SOC) is not decreased, charging command unit 190 sets Pch=0. On this occasion, engine 18 is not operated to charge power storage device 10. Further, when SOCr<#SOC<SOCu, Pch is set at a value for discharging to designate discharging of power storage device 10.

In the configuration shown in FIG. 9, when the SOC estimate value (#SOC) comes close to reference upper limit value Smax, charging/discharging upper limit value setting unit 170 sets charging power upper limit value Win to be low. In this way, overcharging of power storage device 10 is avoided.

On the other hand, in the case where regenerative electric power generated by motor generator MG2 during deceleration or traveling on a downhill exceeds charging power upper limit value Win, the regenerative electric power generation performed by motor generator MG2 is restricted or prohibited. Accordingly, braking power required in the whole of hybrid vehicle 5 cannot be possibly generated. It should be noted that when the regenerative electric power generation is restricted or prohibited, regenerative braking power provided by motor generator MG2 and hydraulic pressure braking power provided by a hydraulic braking structure not shown in figures can be cooperated to generate braking power requested by the whole of the vehicle. In particular, in the case where the regenerative electric power generation is prohibited, the braking power requested by the whole of the vehicle can be generated only by the hydraulic brake structure.

In the braking power control for securing the braking power requested by the whole of the vehicle by means of the cooperation of the regenerative braking power and the hydraulic pressure braking power, when the regenerative electric power generation by motor generator MG2 is restricted or prohibited, the hydraulic pressure braking power needs to be increased so as to correspond to the decrease of the regenerative braking power. However, in the case where the regenerative braking power is abruptly decreased, the increase of the hydraulic pressure braking power (increase of hydraulic pressure) cannot follow the abrupt decrease thereof, with the result that feeling during braking may become bad.

In the electrically powered vehicle according to the present embodiment, as described above, reference upper limit value Smax2 in the long life mode is lower than reference upper limit value Smax1 in the normal mode. Hence, when the long life mode is selected as the charging mode, charging power upper limit value Win is set to be lower than that in the case where the normal mode is selected. Accordingly, a degree of restriction on the regenerative electric power generation becomes high. As a result, feeling during braking may become bad more significantly.

Accordingly, in the electrically powered vehicle according to the present embodiment, when the long life mode is selected as the charging mode and regenerative electric power generated by motor generator MG2 exceeds charging power upper limit value Win, components to recover the excess of regenerative electric power relative to charging power upper limit value Win are switched in the following manner in accordance with the magnitude of margin of the reference capacity for the fully charged capacity of power storage device 10.

Figure 14:
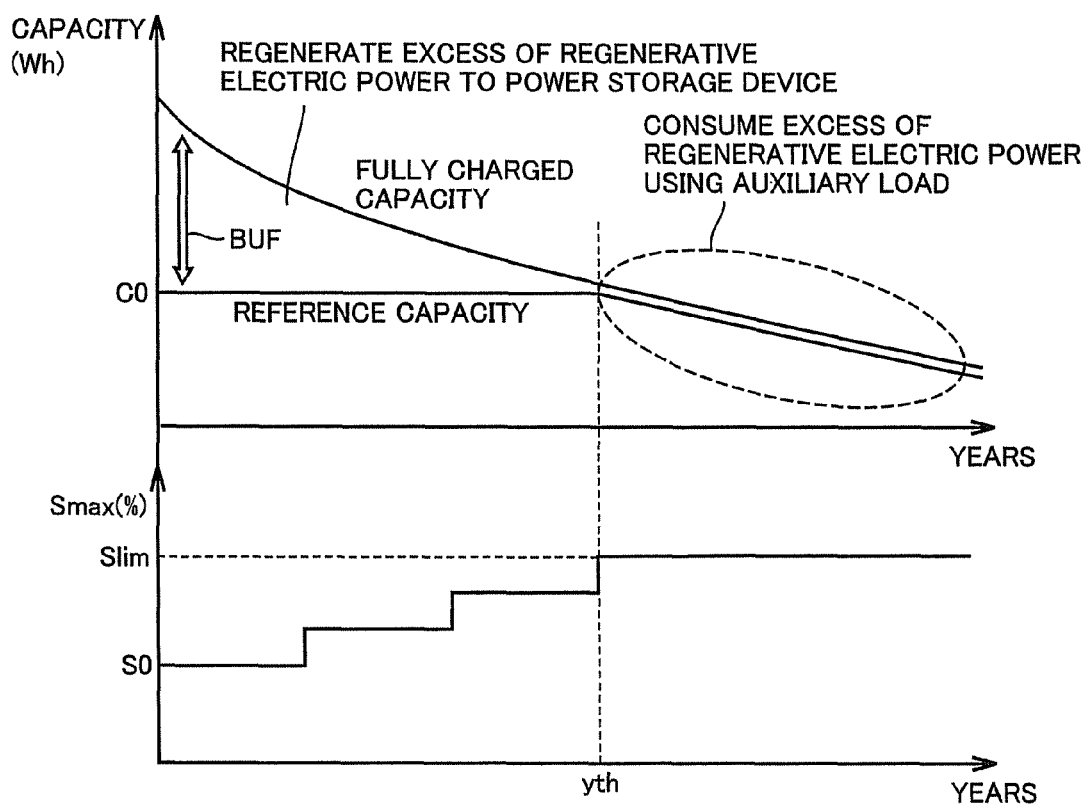
FIG. 14 illustrates the charging control for the power storage device during regenerative braking of the electrically powered vehicle according to the present embodiment.

Referring to FIG. 14, the following describes charging control of power storage device 10 during regenerative braking of the electrically powered vehicle according to the present embodiment.

FIG. 14 shows transitions of the fully charged capacity and the reference capacity of power storage device 10 in the electrically powered vehicle of the present embodiment. Referring to FIG. 14, as the years of utilization of power storage device 10 become longer, the fully charged capacity of power storage device 10 is decreased. The reference capacity is set to have a margin for the fully charged capacity. For the reference capacity, remaining capacity C0 required to achieve a target value of the cruising distance of hybrid vehicle 5 is set at a default value as described above. Reference upper limit value Smax of the SOC of power storage device 10 corresponds to a ratio of the reference capacity to the fully charged capacity of power storage device 10.

When the long life mode is selected as the charging mode, reference range setting unit 160 (FIG. 9) increases reference upper limit value Smax2 in accordance with the degree of decrease of the fully charged capacity of power storage device 10 so as to maintain reference capacity C0 (default value) of power storage device 10 as described above.

In the case where the fully charged capacity reaches C0 (default value) when the years of utilization correspond to predetermined year yth because the fully charged capacity is decreased gradually due to the deterioration of power storage device 10, reference range setting unit 160 changes the reference capacity from default value C0 to the fully charged capacity. In other words, after the years of utilization have reached predetermined year yth, the reference capacity is gradually decreased from default value C0 as the years of utilization become longer.

As a result, reference upper limit value Smax2 employs S0 as a default value until the years of utilization of power storage device 10 reach predetermined year yth, and is increased to exceed default value S0 as the years of utilization become longer. After the years of utilization have reached predetermined year yth, reference upper limit value Smax2 is fixed to a predetermined value Slim corresponding to the ratio of the reference capacity to the fully charged capacity.

As described above, the reference capacity is a threshold value for determining whether or not power storage device 10 has reached the fully charged state, and is set at default value C0 so as to have a margin for the fully charged capacity. BUF in the figure represents the margin. As shown in FIG. 14, margin BUF is decreased according to the decrease of the fully charged capacity until the years of utilization reach predetermined year yth, and becomes substantially zero after the years of utilization have reached predetermined year yth. Namely, as the degree of deterioration of power storage device 10 becomes larger, margin BUF becomes smaller. When regenerative electric power generated by motor generator MG2 exceeds charging power upper limit value Win, traveling control unit 200 (FIG. 4) switches, in accordance with the degree of decrease of margin BUF, between the control for regenerating to power storage device 10 the excess of the regenerative electric power relative to charging power upper limit value Win, and the control for consuming the excess of the regenerative electric power using the auxiliary load.

Specifically, traveling control unit 200 functions margin BUF provided in the remaining capacity, as an electric power buffer for storing regenerative electric power generated by motor generator MG2. Hence, the excess of the regenerative electric power relative to charging power upper limit value Win is recovered to this electric power buffer. In other words, the regenerative electric power generated by motor generator MG2 is regenerated to power storage device 10. In this way, an amount of electric power stored in power storage device 10 can be increased, thereby improving energy efficiency of hybrid vehicle 5.

When margin BUF is decreased to substantially zero, traveling control unit 200 changes a component that is to recover the excess of the regenerative electric power of motor generator MG2 relative to charging power upper limit value Win, from the electric power buffer in power storage device 10 to the auxiliary load (auxiliary device 42, air conditioner 44, and the like). In other words, the excess of the regenerative electric power generated by motor generator MG2 is consumed using the auxiliary load.

Thus, when the regenerative electric power generated by motor generator MG2 exceeds charging power upper limit value Win, traveling control unit 200 selects, in accordance with the correlation between the fully charged capacity and the reference capacity of power storage device 10, one of the electric power buffer in power storage device 10 (margin BUF in FIG. 14) and the auxiliary load as a component to recover the excess of the regenerative electric power relative to charging power upper limit value Win. In this way, the regenerative electric power generation by motor generator MG2 can be avoided from being restricted or prohibited, whereby braking power required by the whole of the vehicle can be secured while preventing feeling during braking control from being bad.

Figure 15:
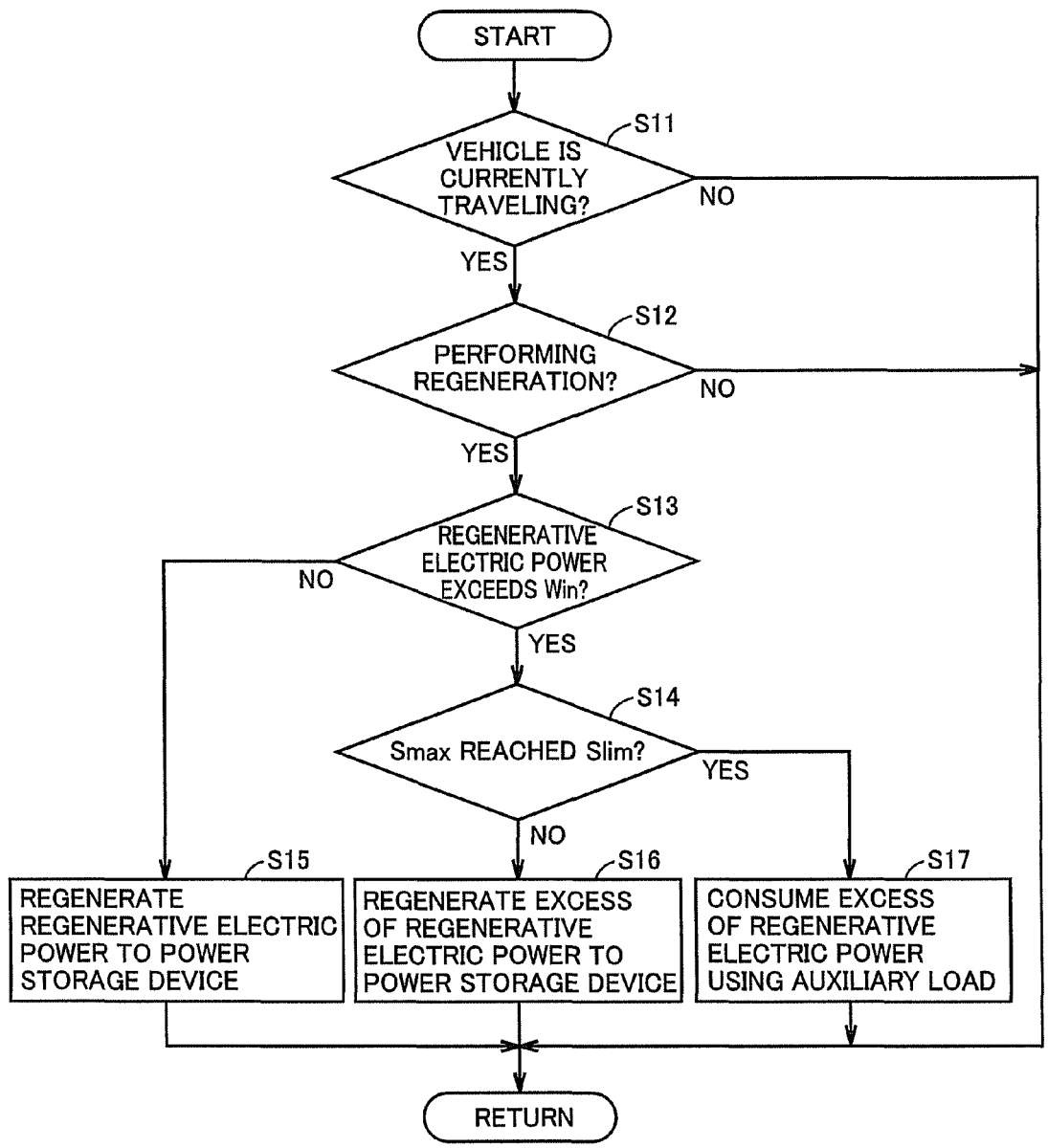
FIG. 15 is a flowchart showing a control process procedure for implementing the charging control for the power storage device during regenerative braking in the electrically powered vehicle according to the present embodiment.

FIG. 15 is a flowchart showing a control process procedure for implementing the charging control for the power storage device during regenerative braking in the electrically powered vehicle according to the present embodiment.

Referring to FIG. 15, in a step S11, traveling control unit 200 determines whether or not hybrid vehicle 5 is currently traveling, based on a traveling mode flag FM provided by traveling mode selecting unit 210. When hybrid vehicle 5 is not currently traveling (NO in step S11), the process concerning the charging control of power storage device 10 is ended.

On the other hand, when hybrid vehicle 5 is currently traveling (YES in step S11), traveling control unit 200 determines in a step S12 whether or not motor generator MG2 is performing regeneration, based on output request of motor generator MG2. Specifically, when the torque command value and the motor rotation speed of motor generator MG2 have different signs, traveling control unit 200 determines that motor generator MG2 is performing regeneration. When motor generator MG2 is not performing regeneration (NO in step S12), the process is ended.

When it is determined that motor generator MG2 is currently performing regeneration (YES in step S12), traveling control unit 200 determines in a step S13 whether or not regenerative electric power generated by motor generator MG2 exceeds charging power upper limit value Win of power storage device 10. It should be noted that charging power upper limit value Win in step S13 has been calculated by charging/discharging upper limit value setting unit 170 based on reference upper limit value Smax set in accordance with the process flow shown in FIG. 13.

When the regenerative electric power generated by motor generator MG2 becomes equal to or less than charging power upper limit value Win (NO in step S13), traveling control unit 200 recovers this regenerative electric power as charging power for power storage device 10 in a step S15.

On the other hand, when the regenerative electric power generated by motor generator MG2 exceeds charging power upper limit value Win (YES in step S13), traveling control unit 200 compares reference upper limit value Smax of power storage device 10 with predetermined value Slim in a step S14. The process in this step S14 corresponds to comparison between the fully charged capacity of power storage device 10 and reference capacity C0. Then, when reference upper limit value Smax has not reached predetermined value Slim (NO in step S14), i.e., when the fully charged capacity has not reached reference capacity C0, traveling control unit 200 causes electric power buffer BUF in power storage device 10 to recover the excess of the regenerative electric power relative to charging power upper limit value Win in a step S16.

Meanwhile, when reference upper limit value Smax has reached predetermined value Slim (YES in step S14), i.e., when the fully charged capacity has reached the reference capacity, traveling control unit 200 consumes the excess of the regenerative electric power using auxiliary device 42 and air conditioner 44 in a step S17.

As described above, according to the embodiment of the present invention, the fully charged state for the SOC control is set to have a margin for the fully charged capacity of the power storage device, and switching is made between the following controls in accordance with the degree of decrease of margin resulting from the deterioration of the power storage device (decrease of the fully charged capacity): the control (corresponding to the "first control" in the invention of the present application) for regenerating, to the power storage device, the excess of the regenerative electric power relative to the charging power upper limit value defined to be associated with the above-described fully charged state; and the control (corresponding to "second control" in the invention of the present application) for consuming the excess thereof using the auxiliary load. By performing the charging control for the power storage device and the regenerative control for the motor in accordance with the degree of deterioration of the power storage device in this way, while suppressing the deterioration of the power storage device and securing the cruising distance of the electrically powered vehicle, feeling during braking can be prevented from being bad by restricting or prohibiting the regenerative electric power generation performed by the motor.

It should be noted that the electrically powered vehicle to which the charging control for the power storage device of the vehicle in the present embodiment is applied is not limited to hybrid vehicle 5 illustrated in FIG. 1. The present invention can be generally and commonly applied to electrically powered vehicles such as electric vehicle and fuel cell vehicle having no engine in addition to the hybrid vehicle, irrespective of the number of motors (motor generators) provided therein and configuration of the driving system, as long as each of the electrically powered vehicles is configured to regenerate, to the power storage device, the electric power generated due to the regenerative braking by the motor. Particularly, it is apparent that the configuration of the hybrid vehicle is not limited to the one illustrated in FIG. 1, and the invention of the present application can be applied to any configuration such as a parallel type hybrid vehicle.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be applied to an electrically powered vehicle including a power storage device and a motor that generates regenerative braking power.

REFERENCE SIGNS LIST

5: hybrid vehicle; 6: converter; 7: system main relay; 8-1, 8-2: inverter; 10: power storage device; 11: monitoring unit; 12: temperature sensor; 13, 16: voltage sensor; 14: current sensor; 15: power control unit; 18: engine; 22: power split device; 24F: driving wheel; 30: control device; 40: DC/DC converter; 42: auxiliary device; 44: air conditioner; 50: charger; 52: charging relay; 54: connector receiving portion; 56: switch; 60: commercial power source; 62: connector portion; 95: speed reducing shaft; 110: state estimating unit; 120: deterioration diagnosis unit; 150: charging/discharging control unit; 160: reference range setting unit; 170: charging/discharging upper limit value setting unit; 180: control range setting unit; 190: charging instructing unit; 200: traveling control unit; 202: sun gear; 204: pinion gear; 206: carrier; 208: ring gear; 210: traveling mode selecting unit; 250: distributing unit; 260: inverter control unit; 270: converter control unit; 280: auxiliary device control unit; MG1, MG2: motor generator; MNL: negative bus; MPL: positive bus; NL: negative line; PL: positive line; SB: auxiliary battery.

The invention claimed is:

1. An electrically powered vehicle comprising:
a chargeable/dischargeable power storage device;
a motor configured to generate vehicle driving power when receiving electric power supplied from said power storage device, and to regenerate electric power, which is generated during regenerative braking of the vehicle, to said power storage device;
an auxiliary load;
a charging control unit that sets a fully charged state of said power storage device so as to have a margin for a fully charged capacity of said power storage device, and that sets a charging power upper limit value permitted in said power storage device, in accordance with an upper limit value of a charge state value of said power storage device, said upper limit value of said charge state value being defined to be associated with said fully charged state; and
a traveling control unit that controls charging power for said power storage device within a range defined by said charging power upper limit value,
said charging control unit setting said fully charged state to be variable in accordance with a degree of deterioration of said power storage device such that said margin becomes smaller as the degree of deterioration of said power storage device is larger,
said traveling control unit switching between first control and second control in accordance with a degree of decrease of said margin when regenerative electric power generated by said motor during regenerative braking of the vehicle exceeds said charging power upper limit value, said first control being control for regenerating, to said power storage device, an excess of said regenerative electric power relative to said charging power upper limit value, said second control being control for consuming the excess of said regenerative electric power using said auxiliary load.

2. The electrically powered vehicle according to claim 1, wherein
said charging control unit sets a ratio of said fully charged state to said fully charged capacity as the upper limit value of said charge state value, assuming that a predetermined reference capacity corresponds to said fully charged state, and when said fully charged capacity reaches said reference capacity, said charging control unit sets the upper limit value of said charge state value by changing said fully charged state from said reference capacity to said fully charged capacity, and
said traveling control unit performs said first control until said fully charged capacity is decreased to said reference capacity, and performs said second control after said fully charged capacity is decreased to said reference capacity.

3. The electrically powered vehicle according to claim 2, wherein
until said fully charged capacity is decreased to said reference capacity, said charging control unit sets the upper limit value of said charge state value to be variable such that the upper limit value of said charge state value is a higher value as the degree of deterioration of said power storage device is larger, and after said fully charged capacity is decreased to said reference capacity, said charging control unit maintains the upper limit value of said charge state value at a predetermined value defined to be associated with said fully charged state, and
said traveling control unit performs said first control until the upper limit value of said charge state value reaches said predetermined value, and said traveling control unit performs said second control after the upper limit value of said charge state value reaches said predetermined value.

4. A method for controlling an electrically powered vehicle,
the electrically powered vehicle including
a chargeable/dischargeable power storage device,
a motor configured to generate vehicle driving power when receiving electric power supplied from said power storage device, and to regenerate electric power, which is generated during regenerative braking of the electrically powered vehicle, to said power storage device, and
an auxiliary load,
the method comprising the steps of:
setting a fully charged state of said power storage device so as to have a margin for a fully charged capacity of said power storage device, and setting a charging power upper limit value permitted in said power storage device, in accordance with an upper limit value of a charge state value of said power storage device, said upper limit value of said charge state value being defined to be associated with said fully charged state; and
controlling charging power for said power storage device within a range defined by said charging power upper limit value,
the step of setting said charging power upper limit value setting said fully charged state to be variable in accordance with a degree of deterioration of said power storage device such that said margin becomes smaller as the degree of deterioration of said power storage device is larger,
the step of controlling said charging power switching between first control and second control in accordance with a degree of decrease of said margin when regenerative electric power generated by said motor during regenerative braking of the electrically powered vehicle exceeds said charging power upper limit value, said first control being control for regenerating, to said power storage device, an excess of said regenerative electric power relative to said charging power upper limit value, said second control being control for consuming the excess of said regenerative electric power using said auxiliary load.

* * * * *